F. M. FOOTE.
ROLLER BEARING.
APPLICATION FILED OCT. 30, 1908.

942,252.

Patented Dec. 7, 1909.

WITNESSES.
Chas. H. Schabinger
Pearl Foote.

INVENTOR.
Frank M. Foote

UNITED STATES PATENT OFFICE.

FRANK M. FOOTE, OF MARSHALL, MICHIGAN.

ROLLER-BEARING.

942,252.  Specification of Letters Patent.  Patented Dec. 7, 1909.

Application filed October 30, 1908. Serial No. 460,231.

*To all whom it may concern:*

Be it known that I, FRANK M. FOOTE, a citizen of the United States, residing at Marshall, in the county of Calhoun and State of Michigan, have invented certain new and useful Improvements in Roller-Bearings, of which the following is a specification.

My present invention relates to roller bearings, and has for an object a construction of this kind wherein a wheel is better held in adjustment as it revolves on a common axle, spindle, or shaft.

A further object is the making of an axle with a detachable shoulder collar and also to hold compressible non-metallic packing in position to receive end thrust from the wheel or wheel boxing, the packing being pressed into a thickness to make the right adjustment to hold the wheel or wheel boxing from end movement, the packing being also free to revolve with the wheel or wheel boxing around the axle, spindle, or shaft, and also a further object is the making of a roller bearing in which all adjusting, jam nuts and locking washers are dispensed with, the adjustment being made by compressing leather or some non-metallic packing in a way to bring all bearing parts in tight adjustment, and to accomplish the above results by means of few and simple parts the arrangement and mechanism of which will be hereinafter described in a particular form of construction, reference being had to the accompanying drawings in which like marks of reference refer to corresponding parts in the different views.

Figure 1:
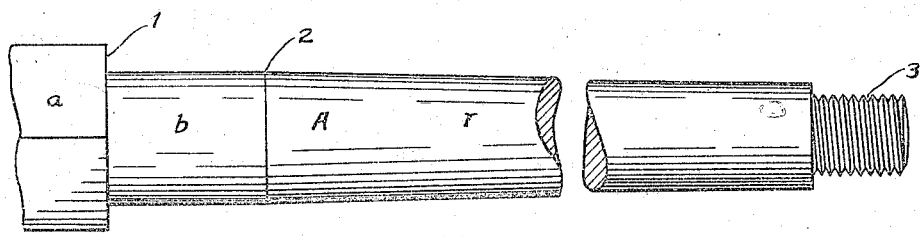
Figure 2:
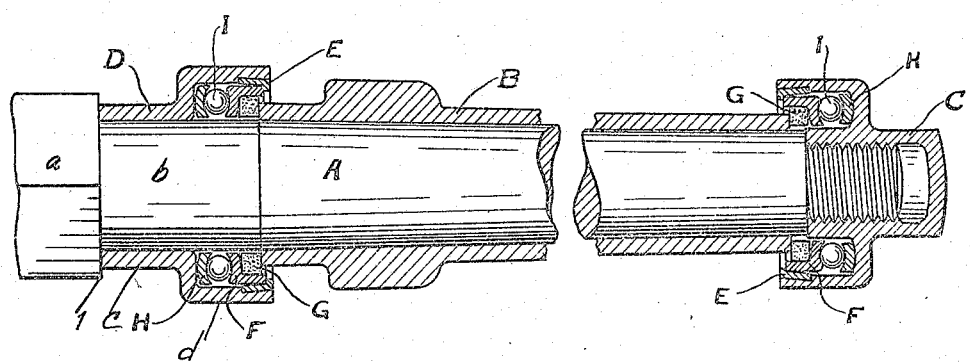
Figure 3:
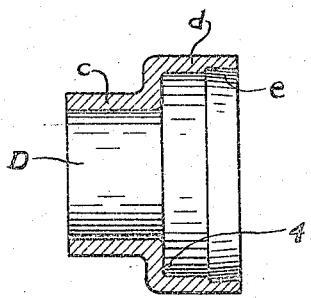
Figure 4:
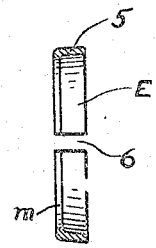
Figure 5:
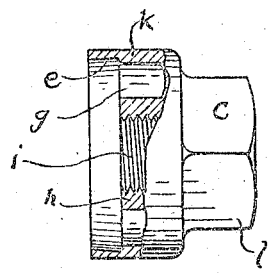
Figure 6:
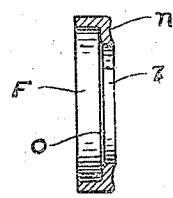

Figure 1, is a longitudinal view of an axle end. Fig. 2, is a longitudinal sectional view of this bearing. Fig. 3, is a sectional view of a detachable collar. Fig. 4, is a detail in section of a locking spring. Fig. 5, is an elevation of a nut, partly in section, with bearing elements removed. Fig. 6, is a sectional view of a cup.

Reference now being had to the details of the drawings: A, is the end of an axle. It is squared at $a$, and rounded at $b$, and also at $c$, and threaded at 3.

D, is a detachable collar made with a contracted end $c$, that fits the axle at $b$, the end of the collar also fits against the shoulder formed where the rounded and squared parts of the axle meet at 1. The detachable collar has an expanded part $d$, and inside of this expanded part an annular shoulder at 4, and at its outer end a slanting groove $e$. Against shoulder 4, is placed race-way ring H, in race-way ring H, are bearing rollers I, and against bearing rollers I, is cup F, and in cup F, is compressible washer G, and outside of cup F, is locking spring E, the spring having an outer slanting part 5, to fit the slanting groove $e$, in the detachable collar. Spring E, is cut at 6, to spring shut when being placed in position and afterward open up to fit the slant in groove $e$, and in that way hold it fast so that it cannot slip from detachable collar D. Spring E, also has an inner annular projection at $m$, to engage with the outer end of cup F, to hold it against displacement. Cup F, is made with an annular race-way at $n$, and an inner annular shoulder at $o$, and the bottom of the cup is cut out at 7, so as to let it slip over the axle and into place against the bearing rollers, the bearing rollers fitting into annular race-way $n$ on the cup, and in this way the cup is prevented from wearing sidewise against the locking spring and is also held central with respect to the axle. Resting against shoulder $o$, in the cup is compressible washer G, that also fits around the axle. Washer G, fits against the end of wheel boxing B, and is free to revolve with it around the axle.

At the outer end of axle A, is nut C. The nut is threaded to the axle at 3. The inner end of the nut is enlarged and grooved out at $g$, and in this groove are the following parts, made the same and performing the same function at this end of the wheel boxing B, as parts already described and bearing the same marks of reference, do at the shouldered end of the wheel boxing, and the special description of parts having like marks of reference are to be taken as already given. In the bottom of groove $g$, is race-way ring H, and in race-way ring H, are bearing rollers I, and against bearing rollers I, is cup F, and in cup F, is compressible washer G, outside of cup F, is locking spring E, that fits in the slanting groove $e$, in the outer extensior $k$, of nut C, the inner extension $h$, of the nut being internally threaded at $j$, to fit the threads on the end of the axle. It will thus be seen that the same race-way, bearing rollers, cup, compressible washer, and locking spring, except as to size, are used at both ends of the wheel boxing, and that both ends of the wheel boxing fit against a compressible washer.

It will therefore be seen that this bearing complete consists of a wheel boxing on an axle and a race-way, bearing rollers, cup, and compressible washer, held fast to a nut by means of a locking spring, the nut being at one end of the wheel boxing, and a race-way, bearing rollers, cup, and compressible washer, held fast to a detachable collar by means of a locking spring, the detachable collar being at the other end of the wheel boxing. Thus it will be seen in this construction, if the distance from compressible washer in the collar cup to compressible washer in nut cup is less than the length of the wheel boxing it will, when the nut is screwed to place compress the washers in the cups at each end of the wheel boxing and thus form a tight adjustment to hold the wheel boxing in place, it will also be seen that when the ends of the wheel boxing press into the compressible washers it will tend to hold the washers central and they will in turn hold the cups to keep them from pressing sidewise against the locking springs to wear them out. It will also be seen that the detachable collar is capable of end movement along the rounded part of the axle and that the square part of the axle forms a stop to prevent the collar from further movement in that direction and also if the squared part of the axle is rounded, a set screw or some other form of stop could be used to prevent the collar from end movement, and it will therefore be seen, by using an open, instead of a capped nut, this bearing could be used on axles other than the ordinary vehicle axle.

Having thus described my invention what I claim and desire to secure by Letters Patent is:

1. In a roller bearing, the combination of an axle spindle having a shoulder, a collar fitting the inner rounded portion of the spindle, one end of the collar contacting with the shoulder and the other end being enlarged, a raceway ring located within the enlarged part of the collar, rollers bearing against the raceway ring, a cup contacting with the bearing rollers, a compressible washer in the cup, a spring ring fitting around the cup and into a slanting groove in the inner side of the enlarged part of the collar, the spring being provided with an annular internally extending rib to engage and hold the cup from displacement.

2. In a roller bearing, the combination of a nut provided with an enlarged portion which is grooved, the other end of the nut being adapted to receive a wrench, a raceway ring located in the groove, rollers bearing against the raceway ring, a cup in contact with the bearing rollers, a compressible washer in the cup and a spring fitting over the outside of the cup and into a slanting groove in the inside of the outer wall of the grooved portion, the spring being provided with an annular internally extending rib to engage and hold the cup from displacement.

3. In a roller bearing, the combination of an axle spindle having a shoulder, a collar fitting the inner rounded portion of the spindle and in contact with the shoulder, the other end of the collar enlarged, an axle nut with an enlarged part which is grooved, a raceway ring located in the groove in the nut and also in the enlarged part of the collar, rollers bearing against the raceway rings, cups in contact with said rollers, compressible washers in the cups, a spring fitting over the outside of each cup and into a slanting groove, the springs provided with an annular internally extending rib to engage and hold the cups from displacement, said compressible washers being located one at each end of a wheel boxing and in direct contact therewith.

FRANK M. FOOTE.

Witnesses:
LOUIS C. MILLER,
FRANK B. SNYDER.